Feb. 6, 1951
F. S. MOSIER
2,540,402
ELECTRICAL TESTING PROBE
Filed April 4, 1947
2 Sheets-Sheet 1
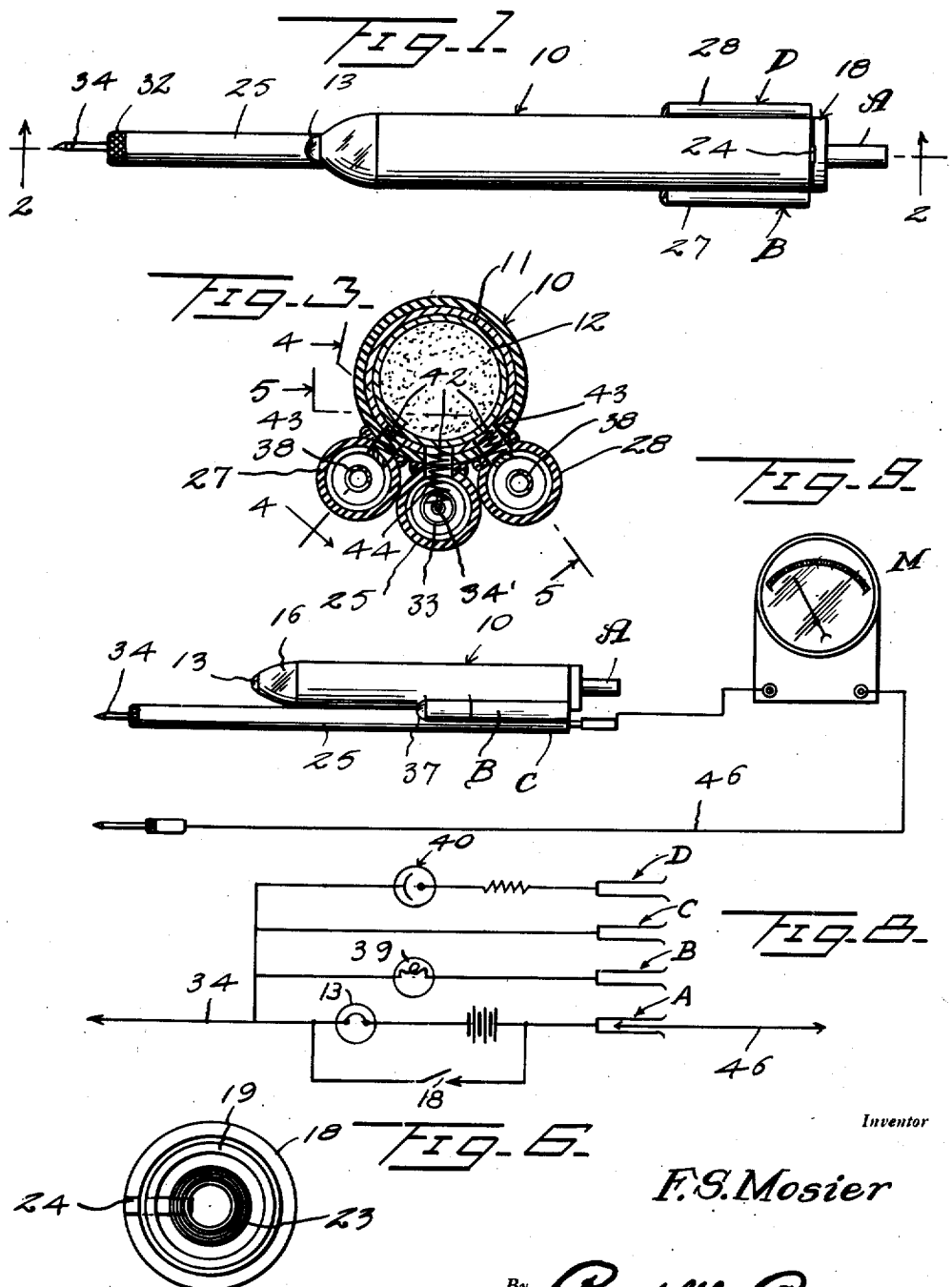

Feb. 6, 1951  F. S. MOSIER  2,540,402
ELECTRICAL TESTING PROBE
Filed April 4, 1947  2 Sheets-Sheet 2
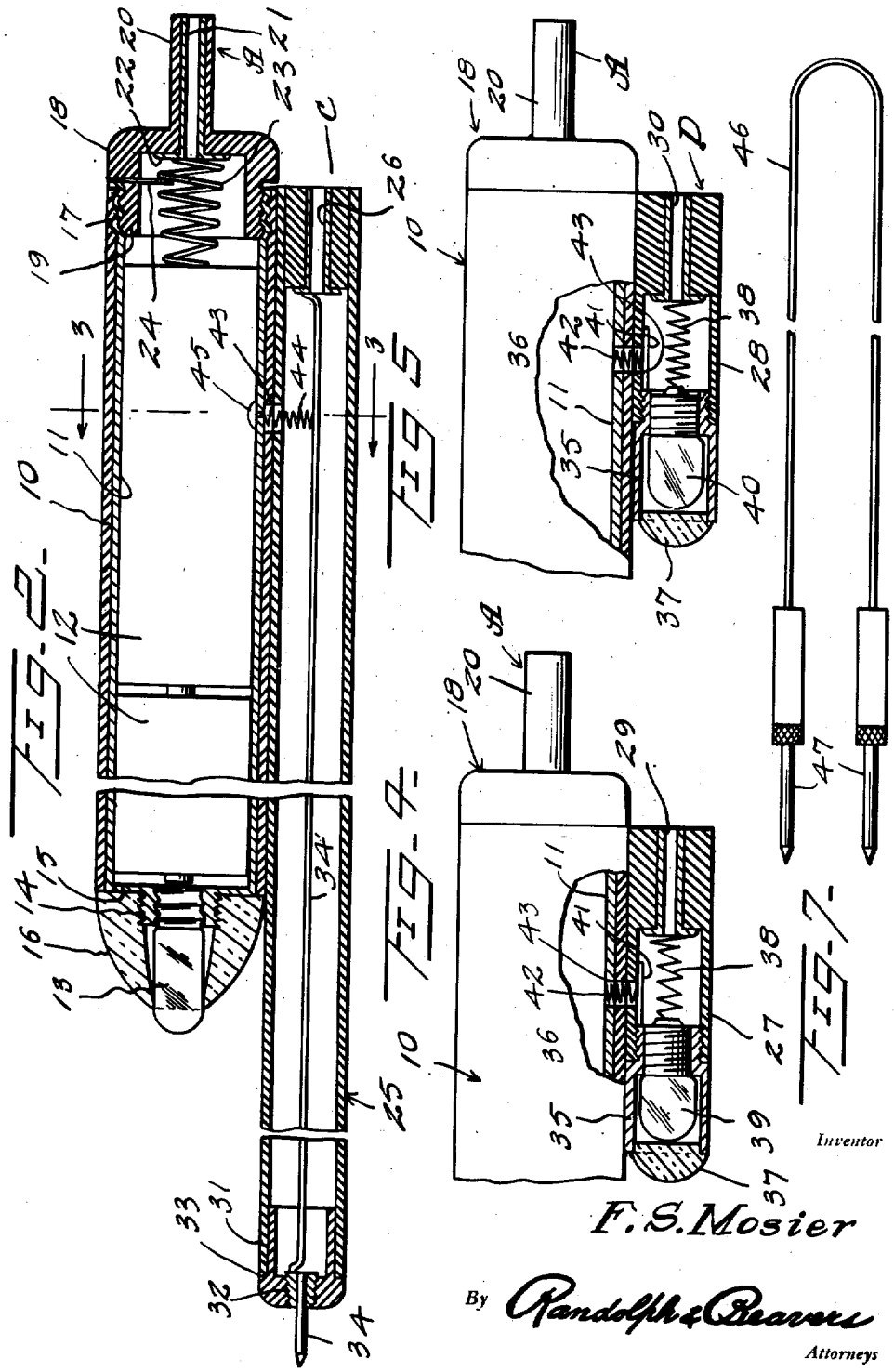
Inventor
F. S. Mosier
By Randolph & Beavers
Attorneys Patented Feb. 6, 1951

2,540,402

UNITED STATES PATENT OFFICE 2,540,402

ELECTRICAL TESTING PROBE

Fern S. Mosier, Berkley, Mich.

Application April 4, 1947, Serial No. 739,501

1 Claim. (Cl. 175—183)

This invention relates to probe testers for testing electrical circuits and components thereof, and a primary object of the invention is to provide a tester of this kind having its own light source arranged and located so that illumination can be directed at all times upon the particular point of contact of the probe with the circuit being tested so as to permit full visual inspection and observation of such point, but may be cut off when at any time such illumination is not desired.

Another important object of this invention is to provide a probe tester of the character above indicated, which combines in mechanical and electrical unification, of compact and readily manipulated form all of the testing facilities for testing circuits and voltages commonly in use, which are required by radio, appliance, and service repairmen, telephone trouble shooters, automotive ignition and wiring mechanics, and others.

Another important object of this invention is to provide a probe tester of the above indicated character which can be constructed of materials of adequate dielectric properties and conductive properties in a rugged and serviceable form at a cost sufficiently low to enable its general adaptation for the purposes indicated.

Other important objects and advantageous features of this invention will be apparent from the following description and accompanying drawings, wherein for purposes of illustration only, a preferred embodiment is set forth.

In the drawings—

Figure 1 is a top plan view of said embodiment.

Figure 2 is a contracted central longitudinal section on an enlarged scale, taken through Figure 1 along the line 2—2.

Figure 3 is a transverse vertical section taken through Figure 2 on the line 3—3.

Figure 4 is an enlarged fragmentary side elevation partly broken away to show structural details of the low voltage test socket with incandescent indicating bulb.

Figure 5 is a similar view showing structural details of the high voltage and current distinguished test socket with neon indicating bulb.

Figure 6 is an inside elevation of the continuity testing socket and flashlight switch knob combined.

Figure 7 is a plan view of a suitable cord used in testing.

Figure 8 is a wiring diagram showing the electrical connections of the various sockets with the main or primary probe and with the flashlight component and its battery, and, Figure 9 is a side elevation, showing the embodiment in use with the cord plugged into another testing socket and connected with a meter.

Referring in detail to the drawings, the herein illustrated embodiment comprises an elongated cylindrical dielectric plastic material casing 10 into which is fitted a conductive metal sleeve 11 of diameter and length suitable to accept preferably two penlight dry cell batteries 12 in end-to-end relation, with the center contact of the forward battery engaged with the base contact of a flashlight bulb 13 screwed into a socket 14 formed on and projecting forwardly from the forward end wall 15 of the metal sleeve. A translucent plastic cone 16, threaded upon the socket 14 provides protection for and forward convergence of the light from the bulb 13, onto the main or primary probe hereinafter described.

The rear end of the rearward battery 12 is spaced from the threaded rear end portion 17 of the metal sleeve 11 into which is threaded the combined socket and switch knob 18, which is cup-shaped and made preferably integral of dielectric plastic material to include the externally threaded reduced portion 19 which threads into the threaded end portion of the metal sleeve 11, and the further reduced socket portion 20 on the opposite side from the threaded portion 19, constituting jack A.

The socket portion 20 has a conductive metal lining 21 which terminates in a contact plate 22 positioned for electrical engagement by the outer end of a helical conductive spring 23, whose inner end is arranged to press against and electrically engage the bottom of the battery case of the rearward battery 12. Set in a radial slot in the inner or forward face of the knob 18 is a metal contactor strip 24 which projects radially inwardly to electrically engage a convolution of the spring 23, so that when the knob 18 is turned in far enough to engage the contact strip 24 with the adjacent end of the metal sleeve 11, a circuit is completed through the spring 23, contact strip 24, sleeve 11 to the outside contact of bulb 13 from the case of the battery 12, to the center contact, the center contact of battery 12 and the center contact of bulb 13, whereby bulb 13 is lighted. Turning out knob 18 far enough to disengage contact 24 from the sleeve 11 puts the bulb 13 out. The conductive lining 21 of the socket 20 of the jack A is in circuit with the flashlight bulb 13 through the spring 23, the battery shell, metal sleeve 11.

Preferably molded integral with the plastic casing 10 or otherwise suitably secured to the underside thereof, are the primary or main probe tube 25 having a metal lined socket 26 at its rear end constituting jack C, and the shorter plastic tubes 27 and 28 located on opposite sides of tube 25 and having metal lined sockets 29 and 30, respectively, constituting jacks B and D, respectively, all of which have their rear ends even with the rear end of the casing 10, with jack A extending rearwardly therebeyond, as shown in Figure 2.

The primary or main probe tube 25 extends parallel with the casing 10 and for a substantial distance forwardly beyond the forward end of casing 10 and the flashlight bulb 13, the forward end of the tube 25 being closed by a dielectric plug 31 having a rounded head 32, in which is threaded a tapered metal plug 33 from which the pointed primary or main probe 34 projects axially, and upon which the light from the bulb 13 is thrown at all times when lit. A conductive rod or wire 34' extends through the bore of the tube 25 and is connected at its opposite ends to the metal plug 33 and the flange of the metal lining of the socket 26, constituting jack C.

The relatively short tubes 27 and 28 are similar and are located symmetrically at opposite sides of the main probe tube 25.

In each of the short tubes 27 and 28, a conductive bulb case 35 is provided which has a reduced neck 36 threaded into the forward end of the tube, into which neck the base of the bulb is threaded to support the bulb in axially spaced relation within the case 35 and behind the magnifying lens 37 mounted in the forward end of case 36. A conductive expanding helical spring 38 has one end engaged with the center base contact of the bulb and its opposite end engaged with the flange on the corresponding conductive linings 29 and 30 of the jacks B and D, respectively. The bulb 39 of the jack B is of the incandescent type, whereas the bulb 40 of the jack D is of the neon type. As shown in Figures 4 and 5, electrical contact is established between the bulb cases 35 and the shell of the battery 12 by means of longitudinal arms 41 which extend rearwardly from the necks 36 and support conductive helical springs 42 in contact with the battery shell through openings 43 formed through the corresponding tubes 27, 28, the casing 10, and the casing lining 11. In the case of the main probe tube 25, similar contact is established by a spring 44 connected between the wire or rod 34' and a button 45, as shown in Figure 2.

A flexible cord 46, shown in Figure 7, may conveniently be used as complementary to the main probe 34, having similar male jack terminals 47 on its opposite ends, either of which is arranged to be plugged into any of the jacks A, B, C and D, with the remaining terminal 47 to be engaged with the circuit or component thereof being tested.

In the illustrated embodiment the incandescent bulb 39 is of 6.8 volt rating, and the neon bulb 40 is of 1/4 watt rating with a 150,000 ohm resistance in series therewith, in order to make the device suitable for testing the most commonly formed voltages, that is, 110 volts A. C. or D. C., 220 volts A. C. or D. C., 440 volts A. C. or D. C. used in lighting, heating, and power applications; 1½ volts A. C. or D. C. to 500 volts A. C. or D. C. used in home and automobile radio circuits; 6 to 12 volts D. C. used in automotive starting, lighting and ignition circuits.

The following are among tests readily made with the above described device:

With knob 18 turned out to put light bulb 13 out and cord 46 plugged into jack A, engagement of main probe 34 and cord terminal 47 with points in a circuit affords a continuity test thereof, in which continuity is indicated by the lighting of bulb 13, a short or an open low voltage circuit being indicated by failure of bulb 13 to light. The bulb 13 may be lighted by turning in the knob 18 to enable properly placing the main probe 34, after which knob 18 is turned out for the continuity test.

When patch cord 46 is plugged into jack B indication of any existing voltage from 1½ to 12 volts is obtained by the non-lighting or the degree of brilliance of the bulb 39. This is useful chiefly for testing automotive circuits and filament voltages in radio circuits.

With the cord 46 plugged into jack C there is direct connection between the jack C and the main probe 34, enabling employment of a conventional meter M, such as shown in Figure 9, with the hands free to manipulate the probe and adequate light for working in tangled wires and dark corners, so that exact placement of the main probe 34 is facilitated.

With the cord 46 plugged into jack D visual indication can be obtained of any existing voltage from 90 to 550 volts A. C. or D. C. by the brightness of neon bulb 40 as visually compared with known voltages. D. C. current is indicated when only one element of the neon bulb 40 glows.

I claim as my invention:

A testing device for electrical circuits comprising a casing open at its rear end and lined with conductive material, a socket at the front end of said casing in conductive engagement with the lining, a light bulb having conventional terminals and mounted in the socket with its outer terminal in contact therewith, a battery in said casing having a terminal at its front end engaging the center terminal of said bulb, a cap screwed into the rear end of said casing and provided with a jack-socket and a metal spring extending therefrom and engaging the rear end of the battery, a contact strip extending through the wall of the jack socket with its inner end engaging the spring and its outer end in position for engaging the lining when the cap is screwed tightly into place, a tube extending longitudinally of said casing and having a probe at its front end and a jack socket at its rear end connected with the probe by a conductor extending longitudinally through the tube and having a portion intermediate its length conductively connected with the lining, an auxiliary tube carried by said casing having a signal lamp provided with conventional terminals at one end and a jack-socket at its other end connected with the signal lamp by a conductor extending longitudinally through the tube, and a conductor connecting the other terminal of signal lamp with the lining.

FERN S. MOSIER.

REFERENCES CITED

The following references are of record in the file of this patent:

UNITED STATES PATENTS

| Number | Name | Date |
|---|---|---|
| 1,528,709 | Trimble | Mar. 3, 1925 |
| 2,413,484 | Berger | Dec. 31, 1946 |
| 2,413,521 | Roskilly | Dec. 31, 1946 |
| 2,418,872 | Fisher | Apr. 15, 1947 |

FOREIGN PATENTS

| Number | Country | Date |
|---|---|---|
| 378,822 | Great Britain | Aug. 18, 1932 |